(12) United States Patent
Yang et al.

(10) Patent No.: US 11,393,625 B2
(45) Date of Patent: Jul. 19, 2022

(54) ELECTRONIC COMPONENT AND METHOD FOR MANUFACTURING THE SAME

(71) Applicant: SAMSUNG ELECTRO-MECHANICS CO., LTD., Suwon-si (KR)

(72) Inventors: Jeong Suong Yang, Suwon-si (KR); Bon Seok Koo, Suwon-si (KR); Sang Wook Lee, Suwon-si (KR); Jung Min Kim, Suwon-si (KR); Sung Min Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 28 days.

(21) Appl. No.: 17/016,799

(22) Filed: Sep. 10, 2020

(65) Prior Publication Data

US 2021/0375546 A1 Dec. 2, 2021

(30) Foreign Application Priority Data

Jun. 1, 2020 (KR) .................. 10-2020-0066003

(51) Int. Cl.
*H01G 4/224* (2006.01)
*H01G 13/00* (2013.01)
*H01G 4/248* (2006.01)
*H01G 4/30* (2006.01)

(52) U.S. Cl.
CPC ............ *H01G 4/224* (2013.01); *H01G 4/248* (2013.01); *H01G 4/30* (2013.01); *H01G 13/003* (2013.01)

(58) Field of Classification Search
None
See application file for complete search history.

(56) References Cited

U.S. PATENT DOCUMENTS

| 9,336,952 | B2 * | 5/2016 | Chung | H01G 4/232 |
| 9,370,102 | B2 * | 6/2016 | Lee | H01G 4/2325 |
| 9,653,211 | B2 | 5/2017 | Kisumi et al. | |
| 9,758,695 | B2 * | 9/2017 | Hong | H01G 4/30 |
| 9,881,741 | B2 * | 1/2018 | Otani | H01F 27/292 |
| 11,094,460 | B2 * | 8/2021 | Yang | H01G 4/012 |
| 2010/0302704 | A1 * | 12/2010 | Ogawa | H01G 4/2325 |
| | | | | 361/306.3 |
| 2011/0193448 | A1 * | 8/2011 | Saruban | H01G 4/005 |
| | | | | 310/311 |
| 2014/0151101 | A1 * | 6/2014 | Lee | H01G 4/12 |
| | | | | 156/89.12 |

(Continued)

FOREIGN PATENT DOCUMENTS

| JP | 2017-135239 A | 8/2017 |
| KR | 10-2016-0016385 A | 2/2016 |
| KR | 10-2019-0038237 A | 4/2019 |

*Primary Examiner* — Dion R. Ferguson
(74) *Attorney, Agent, or Firm* — Morgan, Lewis & Bockius LLP

(57) ABSTRACT

An electronic component includes an electronic component main body including a body and an external electrode disposed on the body. The body includes a dielectric layer and an internal electrode. The electronic component further includes a coating portion including a coating layer, disposed on an external surface of the electronic component main body, and a plurality of projections disposed on the coating layer.

21 Claims, 9 Drawing Sheets

(56) References Cited

U.S. PATENT DOCUMENTS

| | | | |
|---|---|---|---|
| 2014/0182907 A1* | 7/2014 | Lee | H01G 4/30 |
| | | | 174/258 |
| 2015/0077898 A1* | 3/2015 | Chung | H01G 4/232 |
| | | | 361/301.4 |
| 2017/0040112 A1* | 2/2017 | Tanaka | H01G 4/232 |
| 2018/0082787 A1* | 3/2018 | Hamamori | H01G 4/005 |
| 2019/0103224 A1* | 4/2019 | Han | H01G 4/12 |

* cited by examiner

'P'

ELECTRONIC COMPONENT AND METHOD FOR MANUFACTURING THE SAME

CROSS-REFERENCE TO RELATED APPLICATION(S)

This application claims the benefit under 35 USC 119 (a) of Korean Patent Application No. 10-2020-0066003 filed on Jun. 1, 2020 in the Korean Intellectual Property Office, the entire disclosure of which is incorporated herein by reference for all purposes.

TECHNICAL FIELD

The present disclosure relates to an electronic component and a method for manufacturing the same.

BACKGROUND

A multilayer ceramic capacitor (MLCC), a multilayer chip electronic component, is a chip-type condenser mounted on the printed circuit boards of various electronic products such as display devices including liquid crystal displays (LCDs) and plasma display panels (PDPs), computers, smartphones, cell phones, and the like, to allow electricity to be charged therein and discharged therefrom.

A multilayer ceramic capacitor (MLCC) is used in various types of electronic components since it is relatively small and may be easily mounted while implementing high capacitance.

With the recent trend for miniaturization and higher performance in electronic devices, multilayer ceramic capacitors have tended to be miniaturized and to have higher capacitance. Along with such a trend, the importance of reliability of multilayer ceramic capacitors has been increased and, in particular, the importance of moisture resistance reliability has been increased.

In the automobile industry, a greater number of multilayer ceramic capacitors have been required with the development of electric vehicles, autonomous vehicles, and the like. In addition, multilayer ceramic capacitors, used in automobiles and the like, are required to guarantee more severe moisture resistance reliability conditions.

SUMMARY

An aspect of the present disclosure is to provide an electronic component having improved moisture resistance reliability and a method for manufacturing the same.

An aspect of the present disclosure is to provide an electronic component having improved mountability and a method for manufacturing the same.

An aspect of the present disclosure is to provide an electronic component having improved productivity and reduced manufacturing costs and a method for manufacturing the same.

However, the objects of the present disclosure are not limited to the above description, and will be more easily understood in the process of describing specific embodiments of the present disclosure.

According to an aspect of the present disclosure, an electronic component includes an electronic component main body including a body, including a dielectric layer and an internal electrode, and an external electrode, disposed on the body, and a coating portion including a coating layer, disposed on an external surface of the electronic component main body, and a plurality of projections disposed on the coating layer.

According to an aspect of the present disclosure, a method for manufacturing an electronic component includes preparing an electronic component main body including a body, including a dielectric layer and an internal electrode, and an external electrode, disposed on the body, and forming a coating portion, including a coating layer disposed on an external surface of the electronic component main body and a plurality of projections disposed on the coating layer, using vapor deposition.

According to an aspect of the present disclosure, an electronic component includes an electronic component main body including a body and an external electrode disposed on the body, the body including a dielectric layer and an internal electrode, and a plurality of projections comprising an organic material and disposed on an external surface of the electronic component main body.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
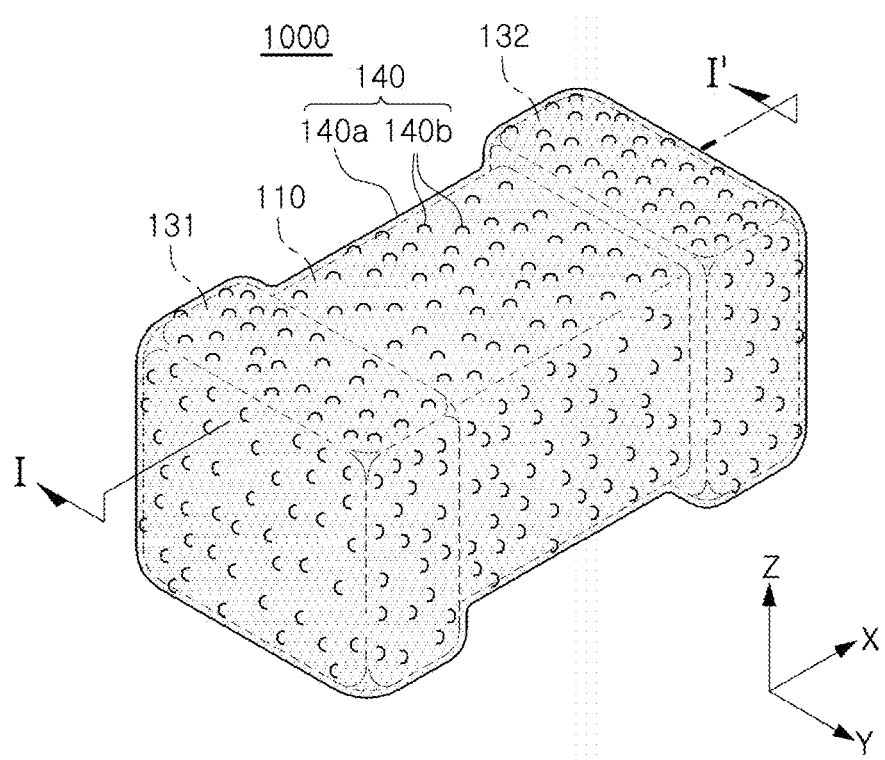
FIG. 1 is a schematic perspective view of an electronic component according to an embodiment of the present disclosure.

Hereinafter, embodiments of the present disclosure will be described with reference to specific embodiments and the accompanying drawings. However, embodiments of the present disclosure may be modified to have various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

A value used to describe a parameter such as a 1-D dimension of an element including, but not limited to, "length," "width," "thickness," "diameter," "distance," "gap," and/or "size," a 2-D dimension of an element including, but not limited to, "area" and/or "size," a 3-D dimension of an element including, but not limited to, "volume" and/or "size", and a property of an element including, not limited to, "roughness," "density," "weight," "weight ratio," and/or "molar ratio" may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

In the drawings, portions not related to the description will be omitted for clarification of the present disclosure, and a thickness may be enlarged to clearly show layers and regions. Further, throughout the specification, when an element is referred to as "comprising" or "including" an element, it means that the element may further include other elements as well, without departing from the description, unless specifically stated otherwise.

In the drawings, an X direction may be defined as a second direction, an L direction, or a longitudinal direction; a Y direction may be defined as a third direction, a W direction, or a width direction; and a Z direction may be defined as a first direction, a stacking direction, a T direction, or a thickness direction.

Electronic Component

FIG. 1 is a schematic perspective view of an electronic component according to an embodiment of the present disclosure.

Figure 2:
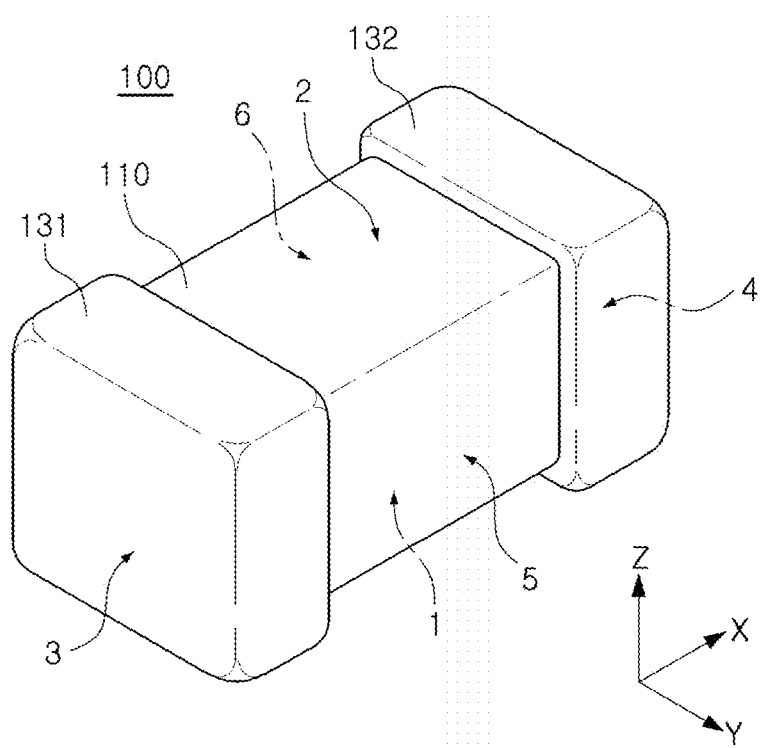
FIG. 2 is a schematic perspective view of a body of the electronic component except for a coating portion in FIG. 1.

FIG. 2 is a schematic perspective view of a body of the electronic component except for a coating portion in FIG. 1.

Figure 3:
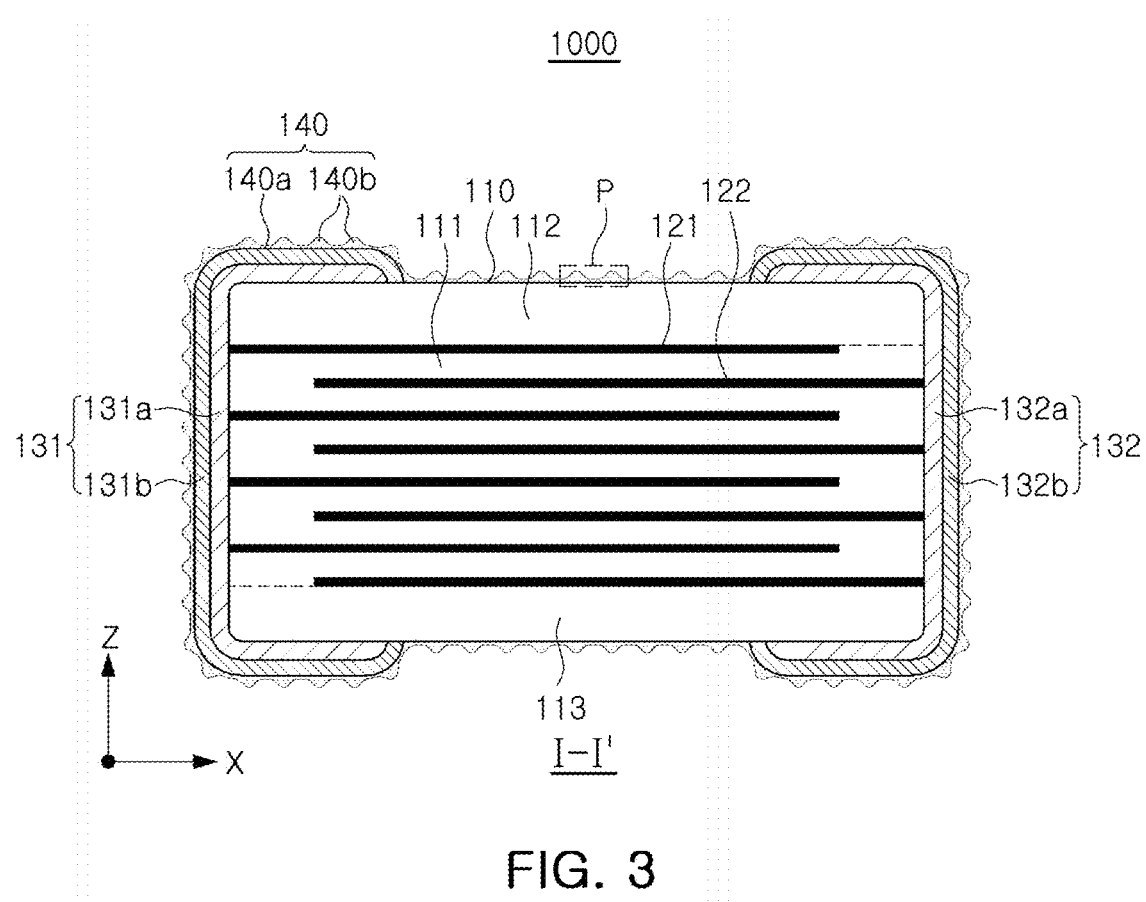
FIG. 3 is a cross-sectional view taken along line I-I' in FIG. 1.

FIG. 3 is a cross-sectional view taken along line I-I' in FIG. 1.

Figure 4:
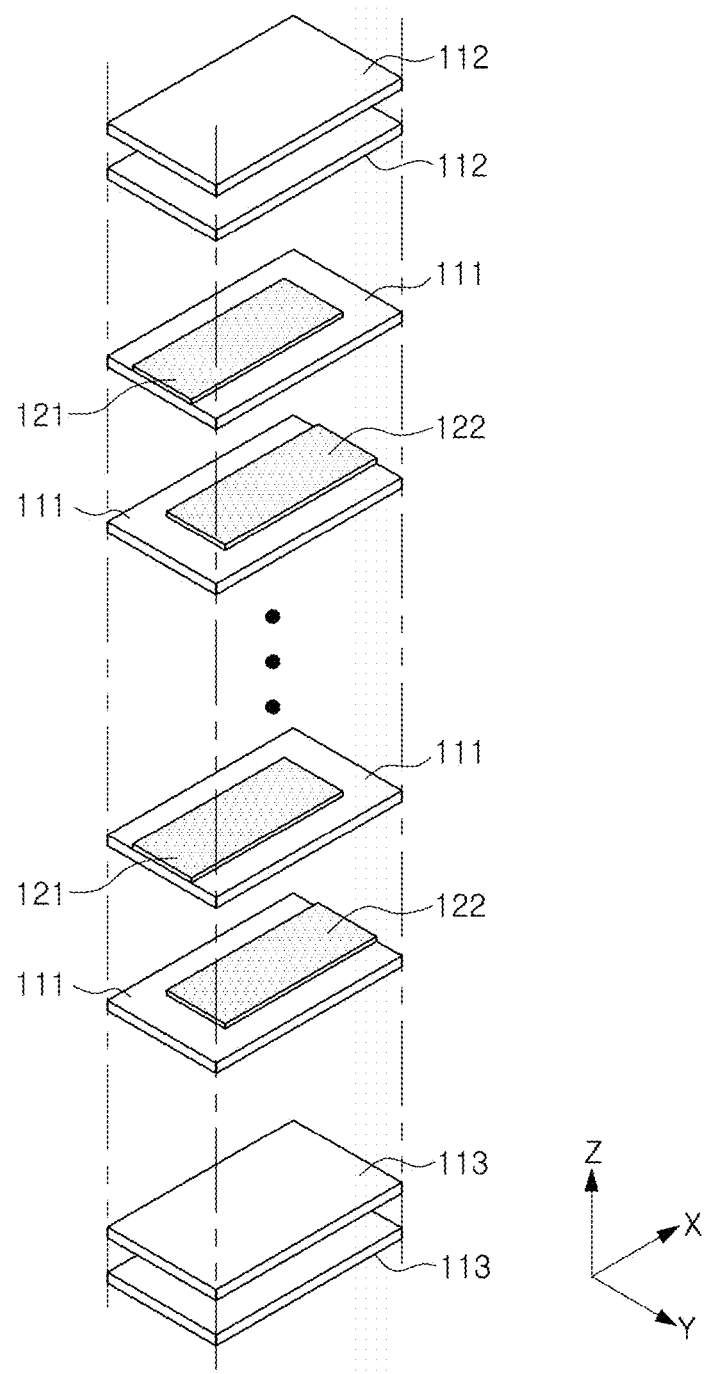
FIG. 4 is a schematic exploded perspective view of the body in FIG. 2, in which dielectric layers and internal electrodes are laminated.

FIG. 4 is a schematic exploded perspective view of the body in FIG. 2, in which dielectric layers and internal electrodes are laminated.

Figure 5:
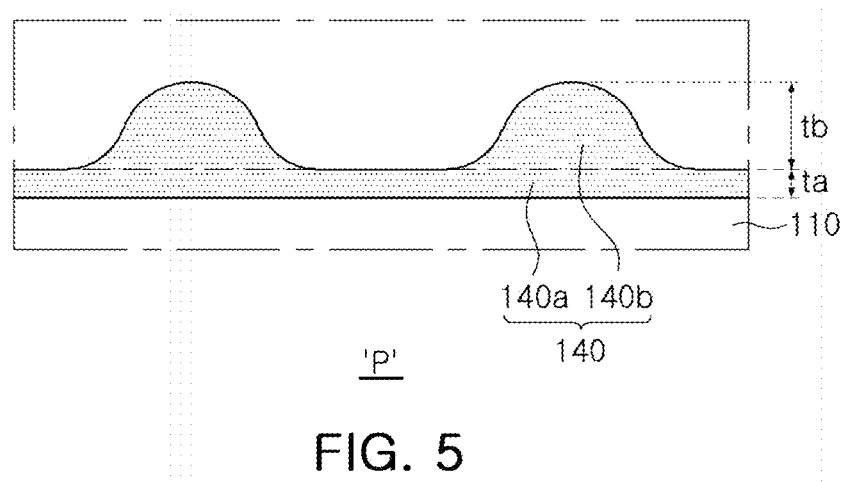
FIG. 5 is an enlarged view of P region in FIG. 3.

FIG. 5 is an enlarged view of P region in FIG. 3.

Hereinafter, an electronic component 1000 according to an embodiment of the present disclosure will be described with reference to FIGS. 1 to 5.

An electronic component 1000 according to an embodiment may include an electronic component main body 100, including a body 110 including dielectric layers 111 and internal electrodes 121 and 122, and external electrodes 131 and 132 disposed on the body 110, and a coating portion 140 including a coating layer 140a disposed on an external surface of the electronic component main body 100 and a plurality of projections 140b disposed on the coating layer 140a.

The electronic component main body 100 includes the body 110 and the external electrodes 131 and 132 disposed on the body 110.

In the body 110, the dielectric layers 111 and the internal electrodes 121 and 122 are alternately laminated.

Although a specific shape of the body 110 is not necessarily limited, as illustrated, the body 110 may have a hexahedral shape or the like. Due to shrinkage of ceramic powder particles contained in the body 110 during a sintering process, the body 110 may not have a perfectly hexahedral shape with completely straight lines, but may have a substantially hexahedral shape overall.

The body 110 may have first and second surfaces 1 and 2 opposing each other in a thickness direction (the Z direction), third and fourth surfaces 3 and 4 connected to the first and second surfaces 1 and 2 and opposing each other in a length direction (the X direction), and fifth and sixth surfaces 5 and 6 connected to the first and second surfaces 1 and 2, connected to the third and fourth surfaces 3 and 4, and opposing each other in a width direction (the Y direction).

A plurality of dielectric layers 111 forming the body 110 may be in a sintered state, and adjacent dielectric layers 111 may be integrated with each other such that boundaries therebetween are not readily apparent without using a scanning electron microscope (SEM).

According to an embodiment, a raw material for forming the dielectric layers 111 is not necessarily limited as long as sufficient capacitance may be obtained therefrom. For example, the raw material may be a barium titanate-based material, a lead composite perovskite-based material, a strontium titanate-based material, or the like. The barium titanate-based material may include $BaTiO_3$-based ceramic powder particles. Examples of the ceramic powder particles may be $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$, or the like, in which calcium (Ca), zirconium (Zr), or the like, is partially solid-solubilized in $BaTiO_3$.

In addition to the ceramic powder particles, various ceramic additives, organic solvents, binders, dispersants, or the like, may be added as the raw material forming the dielectric layer 111, depending on the purpose of the present disclosure.

The body 110 may include a capacitance forming portion, disposed in the body 110, in which capacitance is formed, including the first and second internal electrodes 121 and 122 disposed to oppose each other with the dielectric layer 111 interposed therebetween, and an upper protection layer 112 and a lower protective layer 113, respectively disposed above and below the capacitance forming portion.

The capacitive forming portion contributes to capacitance formation of a capacitor, and may be formed by repeatedly laminating a plurality of first and second internal electrodes 121 and 122 with respective dielectric layers 111 interposed therebetween.

The upper protective layer 112 and the lower protective layer 113 may be formed by laminating one or two or more dielectric layers on upper and lower surfaces of the capacitance forming portion in a vertical direction, respectively, and may serve to prevent the first and second internal electrodes 121 and 122 from being damaged by physical or chemical stress.

The upper protective layer 112 and the lower protective layer 113 may not include an internal electrode, and may include the same material as the dielectric layer 111.

The internal electrodes 121 and 122 may include a first electrode 121 and a second internal electrode 122. The first and second internal electrodes 121 and 122 are alternately disposed to oppose each other with respective dielectric layers 111, constituting the body 110, interposed therebetween, and may be exposed to the third and fourth surfaces 3 and 4 of the body 110, respectively.

Referring to FIGS. 2 and 4, the first internal electrode 121 may be spaced apart from the fourth surface 4 and may be exposed to through the third surface 3, and the second internal electrode 122 may be spaced apart from the third surface 3 and may be exposed through the fourth surface 4.

In this case, the first and second internal electrodes 121 and 122 may be electrically separated from each other by respective dielectric layers 111 interposed therebetween.

Referring to FIG. 4, the body 110 may be formed by alternately laminating a ceramic green sheet, on which the first internal electrode 121 is printed, and a ceramic green sheet, on which the second internal electrode 122 is printed, and then sintering the laminated ceramic green sheets.

A material for forming the internal electrodes 121 and 122 is not necessarily limited, and a material having improved electrical conductivity may be used. For example, the internal electrodes 121 and 122 may be formed by printing a conductive paste for the internal electrodes including at least one of nickel (Ni), copper (Cu), palladium (Pd), silver (Ag), gold (Au), platinum (Pt), tin (Sn), tungsten (W), titanium (Ti), and alloys thereof, on the ceramic green sheet.

A screen-printing method, a gravure printing method, or the like, may be used as a printing method of the conductive paste for the internal electrodes, but the present disclosure is not limited thereto.

The external electrodes 130 and 140 may be disposed on the body 110 and connected to the internal electrodes 121 and 122, respectively. In addition, the external electrodes 130 and 140 may include first and second external electrodes 130 and 140, respectively disposed on the third and fourth surfaces 3 and 4 of the body 110 to be connected to the first and second internal electrodes 121 and 122.

Although the structure, in which the electronic component 100 includes two external electrodes 130 and 140, has been described in this embodiment, the number, shape, and the like, of the external electrodes 130 and 140 may vary depending on the shape of the internal electrodes 121 and 122 or other purposes.

The external electrodes 131 and 132 may be formed of any material such as a metal, or the like, as long as it has electrical conductivity, and may be determined in consideration of electrical characteristics, structural stability, and the like. Moreover, each of the external electrodes 131 and 132 may have a multilayer structure.

For example, the external electrodes 131 and 132 may include electrode layers 131a and 132a, disposed on the body 110, and plating layers 131b and 132b formed on the electrode layers 131a and 132a.

According to the present disclosure, organic acid and molten tin (Sn) may easily permeate the external electrodes 131 and 132 through a region of the coating layer 140a, in which the projection 140b is not disposed, for example, a partially thin region of the coating portion 140 during a soldering process to improve mountability. Accordingly, even when the external electrodes 131 and 132 include the electrode layers 131a and 132a disposed on the body 110 and the plating layers 131b and 132b formed on the electrode layers 131a and 131b and the coating portion 140 is disposed on the plating layers 131b and 132b, improved mountability may be implemented.

As a more detailed example of the electrode layers 131a and 132a, each of the electrode layers 131a and 132a may be a sintered electrode, including a conductive metal and a glass, or a resin-based electrode including a conductive metal and a resin.

Alternatively or additionally, the electrode layers 131a and 132a may have a form in which a plastic electrode and a resin-based electrode are sequentially formed on a body. The electrode layers 131a and 132a may be formed by transferring a sheet, including a conductive metal, to the body or may be formed by transferring a sheet, including a conductive metal, to a sintered electrode.

A material having improved electrical conductivity may be used as the conductive metal included in the electrode layers 131a and 132a, and the present disclosure is not limited thereto. For example, the conductive metal may be at least one of nickel (Ni), copper (Cu), and alloys thereof.

As a more detailed example of the plating layers 131b and 132b, the plating layers 131b and 132b may be Ni plating layers or Sn plating layers, and may have a structure in which a Ni plating layers and a Sn plating layer are sequentially formed on the electrode layers 131a and 132a, or a structure in which a Sn plating layer, a Ni plating layer, and a Sn plating layer are sequentially formed. Alternatively or additionally, the plating layers 131b and 132b may include a plurality of Ni plating layers and/or a plurality of Sn plating layers.

The coating portion 140 may include a coating layer 140a, disposed on an external surface of the electronic component main body 100, and a plurality of projections 140b disposed on the coating layer 140a.

Since a body prepared by sintering ceramic powder particles is formed by high-temperature sintering, a metal oxide having high surface energy may be exposed externally. Therefore, a body surface is high in hydrophilicity and has a structure vulnerable to ion migration occurring through water condensed on the body surface under high-temperature and high-humidity conditions. The term "ion migration" refers to a phenomenon in which a conductive metal is dissolved and ionized on a surface, a boundary surface, and an inside of an insulator to migrate and precipitate.

A method of coating a material having low surface energy on a body surface has been proposed to prevent ion migration. However, since not only an external surface of the body but also an external electrode is coated, electrical connectivity of the external electrode is deteriorated. In addition, defects such as slipping or non-mounting may occur during a process of performing reflow soldering on a printed circuit board (PCB) using Sn.

Therefore, in the related art, a coating preventing portion is disposed to prevent a surface of an external electrode from being coated. After the coating is completed, the coating preventing portion is removed. Alternatively, a body and an external electrode are coated overall, and then a portion coated on the external electrode is separately removed. Accordingly, productivity may be decreased or manufacturing costs may be increased.

According to the present disclosure, since the coating portion 140 includes the coating layer 140a disposed on the external surface of the electronic component main body 100 and a plurality of projections 140b disposed on the coating layer 140a, moisture resistance reliability may be improved, and mountability may be secured and electrical connectivity may be improved through a region of the coating layer 140 in which the projections 140b are not disposed.

Therefore, a process of preventing the coating portion 140 from being disposed on the external electrodes 131 and 132 or a process of removing the coating portion 140 formed on the external electrodes 131 and 132 is not required, and thus, productivity of the component 1000 may be improved and manufacturing costs may be reduced.

The coating layer 140a may basically seal pores or cracking of the body 100 to prevent moisture from permeating into the body 110 through the external surface of the body 100. In addition, since organic acid or molten Sn may easily permeate into the external electrodes 131 and 132 through a region of the coating layer 140a, in which the projection 140b is not disposed, for example, a partially thin region of the coating portion 140, mountability may be improved.

According to the present disclosure, since the coating layer 140a may have a thin portion or a partially broken region, a sufficient moisture resistance reliability improvement effect may not be obtained by only the coating layer 140a. However, since the plurality of projections 140b are disposed on the coating layer 140a, sufficient moisture resistance reliability may be secured even in a high-temperature and high-humidity environment.

The coating layer 140a is disposed to be in contact with the external surfaces of the external electrodes 131 and 132, and may be disposed to be in contact with a region of the external surface of the body 110 in which the external electrodes 131 and 132 are not disposed.

Figure 6:
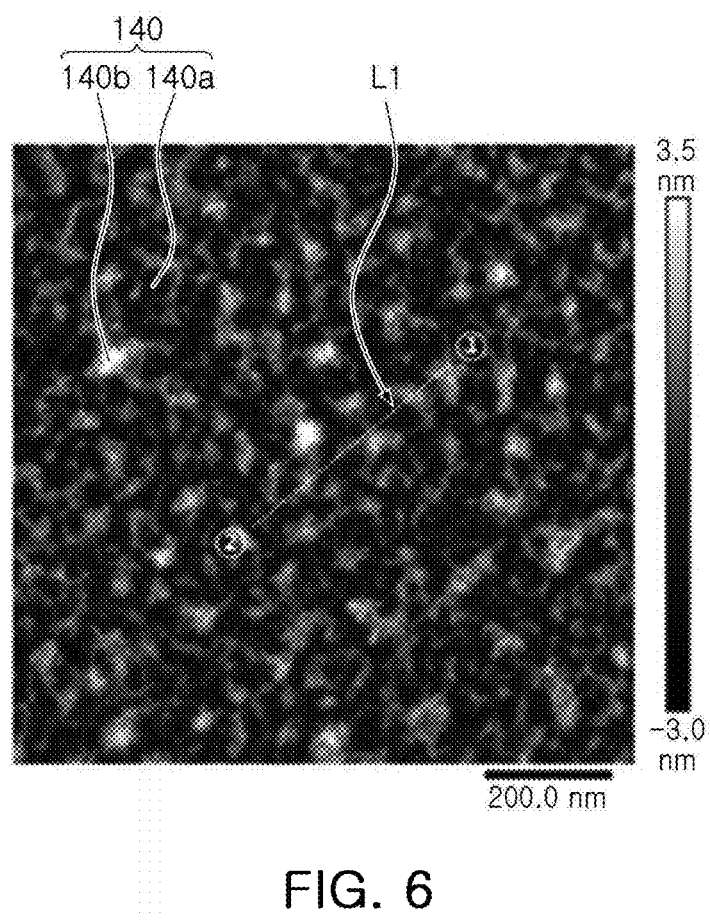
FIG. 6 is an image, captured by an atomic force microscope (AFM), showing a surface of a coating portion disposed on a (1 μm×1 μm) region of a central portion of a second surface of a body of an electronic component according to an embodiment of the present disclosure in width and length directions (Y and X directions).

FIG. 6 is an image, captured by an atomic force microscope (AFM), of a surface of a coating portion disposed on a (1 μm×1 μm) region of a central portion of a second surface of a body of an electronic component according to an embodiment of the present disclosure in width and length directions (Y and X directions). As can be seen from FIG. 6, a height of a brightest portion is 3.5 nm, a height of a darkest portion is −3.0 nm, and a coating portion includes a coating layer (a dark portion) and a plurality of projections (a bright portion) disposed on the coating layer.

An average thickness of the coating portion 140 may be 5 to 30 nm.

When the average thickness of the coating portion 140 is less than 5 nm, it may be difficult to secure a contact angle of the coating portion 140 to water to 100 degrees or more. When the contact angle of the coating portion 140 is less than 100 degrees, the moisture resistance reliability improvement effect may be insufficient.

On the other hand, when the average thickness of the coating portion 140 is more than 30 nm, it may be difficult to implement a partially thin region in the coating portion. Therefore, it may difficult for the organic acid and molten tin (Sn) to permeate into the external electrodes 131 and 132 during the soldering process, which causes mountability to be deteriorated. In addition, the electrical connectivity of the external electrodes 131 and 132 may be deteriorated, and it may be difficult to implement a structure in which the coating portion 140 may include the coating layer 140a and the plurality of projections 140b.

In one example, referring to FIG. 6, the average thickness of the coating portion 140 may be an average value of a coating portion thickness measured, using an ellipsometer, with respect to a certain line L1 having a length of, for example, 400 nm selected in a (1 μm×1 μm) region of a central portion of a first or second surface of the body in width and length directions (Y and X directions). The ellipsometer is an instrument which may measure a difference in polarized states between incident light and reflected light on a surface of a thin film to measure a thickness, a reflective index, and the like, of the thin film.

At least one of the plurality of projections 140b may have a height tb of 3 nm or more.

When the height tb of at least one of the plurality of projections 140b is less than 3 nm, the average thickness of the coating portion 140 may be less than 5 nm and the moisture resistance reliability improvement effect may be insufficient.

The height tb of the projection may be measured by observing the surface of the coating portion with an atomic force microscope (AFM).

In one example, the height tb of the projection may be a difference Δt between a valley and a ridge in the graph of surface roughness measured, using an atomic force microscope (AMF), along the certain line L1 having a length of 400 nm selected in the (1 μm×1 μm) region of a central portion of the first or second surface of the body in the width and length directions (the Y and X directions).

Figure 7:
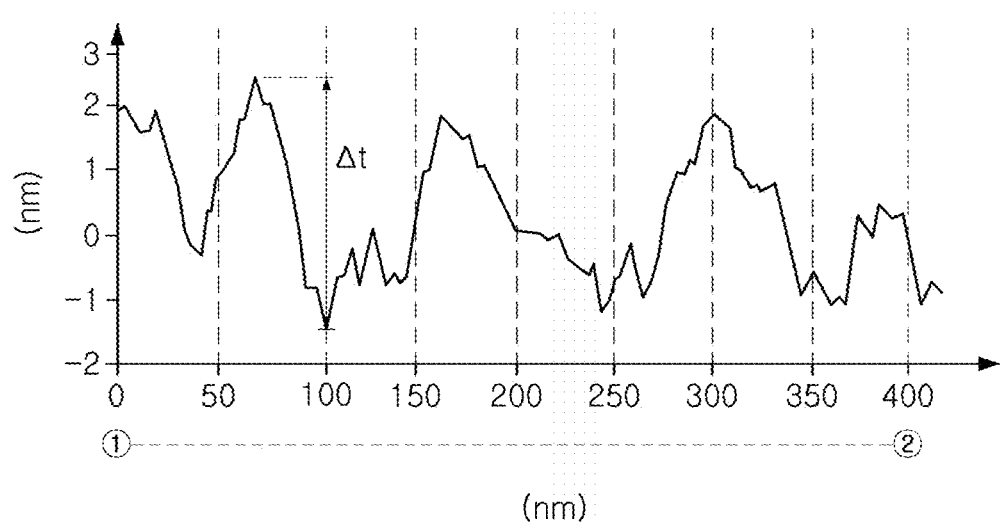
FIG. 7 is a graph illustrating surface roughness of a coating portion measured along a measurement line L12 of FIG. 6 using an atomic force microscope (AFM).

As can be seen from FIG. 7, a surface roughness graph obtained by measuring the surface roughness of the coating portion along the L1 in FIG. 6 with the atomic force microscope (AMF), a difference Δt between a valley and a ridge was 3.875 nm and a sufficient projection was formed.

In addition, the height tb of the projection 140b may be more than twice a thickness ta of the coating layer 140a. This is because the height tb of the projection 140b may be, in detail, greater than or equal to twice the thickness ta of the coating layer 140a to allow the coating portion 140 to have an average thickness of 5 to 30 nm.

The centerline average roughness Ra of the surface of the coating portion may be 0.3 nm or more.

The centerline average roughness Ra of the surface of the coating portion may be a value obtained based on Equation 1 from the surface roughness graph measured, using an atomic force microscope (AMF), along the certain line L1 having a length of 400 nm selected in the (1 μm×1 μm) region of a central portion of the first or second surface of the body in the width and length directions, as an example. For example, the centerline average roughness Ra is expressed in nm as a value obtained by dividing an area of the roughness by a measurement length based on the center line. In addition, since the centerline average roughness Ra was measured with respect to a line having a length of 400 nm, L in Equation 1 has a length of 400 nm and the centerline is a line in a horizontal axis direction in which a vertical axis is 0 in FIG. 7.

$$Ra = \frac{1}{L}\int_0^L |f(x)|dx \qquad \text{Equation 1}$$

A contact angle of the coating portion 140 to water may be 100 degrees or more. This is because the moisture resistance reliability improvement effect may be insufficient when the contact angle of the coating 140 to the water is less than 100 degrees.

A width of the projection 140b does not need to be limited, but may be, for example, 30 to 100 nm. This is because the width of the projection 140b may be, in detail, 30 to 100 nm to allow the coating portion 140 to have an average thickness of 5 to 30 nm.

An area occupied by the plurality of projections 140b does not need to be limited, but may be, for example, 10 to 60% of the overall area of the coating portion 140. This is because the area occupied by the plurality of projections 140b is, in detail, 10 to 60% of the overall area of the coating portion 140 to allow the coating portion 140 to have an average thickness of 5 to 30 nm.

The coating portion 140 may include at least one of a siloxane-based polymer and/or a fluorine-based polymer. The siloxane-based polymer and the fluorine-based polymer may have low surface energy and have a hydrophobic property to improve moisture resistance reliability. In addition, the siloxane-based polymer and the fluorine-based polymer may easily implement the coating portion 140 of the present disclosure using vapor deposition. In this case, the coating portion 140 may include an organic material or be made of an organic material.

Since the coating layer 140a and the projection 140b may be formed using a single process, they may include the same material.

A method for preparing the coating portion 140 is not necessarily limited, and the coating portion 140 may be formed using atomic layer deposition (ALD), molecular layer deposition (MLD), chemical vapor deposition (CVD), or the like.

The coating layer 140a' may have one or more openings. This is because growth of the coating layer 140a' may be insufficient in a certain region, and thus, may be present in a broken form, as illustrated in FIG. 8B.

In this case, an area of the one or more openings may be 10% or less of an overall area of the coating layer 140a'. This is because, when the area of the one or more openings is greater than 10% of the overall area of the coating layer 140a', moisture resistance reliability may be deteriorated.

Method for Manufacturing Electronic Component

Hereinafter, a method for manufacturing an electronic component according to another aspect of the present disclosure will be described in detail. However, descriptions overlapping those given in the electronic component will be omitted to avoid overlapping descriptions.

A method for manufacturing an electronic component according to another aspect of the present disclosure may include preparing an electronic component main body including a body, including a dielectric layer and an internal electrode, and an external electrode disposed on the body and forming a coating portion, including a coating layer disposed on an external surface of the electronic component main body and a plurality of projections disposed on the coating layer, using vapor deposition.

Preparing Electronic Component Main Body

A conductive paste for an internal electrode may be applied to a ceramic green sheet using a printing method, or the like, to print an internal electrode. A printing method of the conductive paste may be a screen-printing method, a gravure printing method, or the like, but the present disclosure is not limited thereto.

Ceramic green sheets, on which internal electrodes are printed, may be laminated and sintered to form a body 110. The number of the laminated sheets, on which internal electrodes are printed, may be adjusted depending on capacitance of a capacitor.

External electrodes 131 and 132 may be formed on the body 110 to form an electronic component main body 100.

The external electrodes 131 and 132 may be formed by forming electrode layers 131a and 132a on the body 110 and forming plating layers 131b and 132b on the electrode layers 131a and 132a.

A method of forming the electrode layers 131a and 132a is not necessarily limited, and the electrode layers 131a and 132a may be formed by applying a paste including a conductive metal and a glass, a paste including a conductive metal and a resin, or the like. Alternatively or additionally, the electrode layers 131a and 132a may be formed by a method of transferring a sheet, including a conductive metal, to the body 110 or a method of transferring a sheet, including a conductive metal, to a sintered electrode.

Forming Coating Portion

A coating portion 140 may be formed on the external surface of the electronic component main body 100 using vapor deposition.

The vapor deposition for forming the coating portion 140 may be atomic layer deposition (ALD), molecular layer deposition (MLD), chemical vapor deposition (CVD), or the like.

When initiated chemical vapor deposition (iCVD), a type of CVD, is used, the formation of the coating portion 140 may be more easily implemented. This is because ALD, MLD, or the like, may cause a coating portion to have a uniformly significantly low thickness, so that it may be difficult to secure moisture resistance reliability while the coating portion includes a coating layer and a plurality of projections. Meanwhile, iCVD may implement a structure, in which a coating portion includes a coating layer and a plurality of projections, while implementing an appropriate thickness.

According to the iCVD, a monomer M of a polymer, constituting a coating portion 140 in a chamber, may be vaporized to form the coating portion 140 through a gas-phase polymerization reaction in which a polymerization reaction of the polymer and a film-forming process are simultaneously performed. An initiator I and a monomer M may be vaporized by the iCVD, so that a chain polymerization reaction may be performed using free radicals R in a gaseous phase to deposit the coating portion on a surface of the electronic component main body 100.

As a detailed example, a monomer M of a siloxane-based polymer and/or a fluorine-based polymer may be vaporized in a gaseous phase to form the coating portion 140 through a gas-phase polymerization reaction in which a polymerization reaction of the polymer and a film-forming process are simultaneously performed.

Figure 8A:
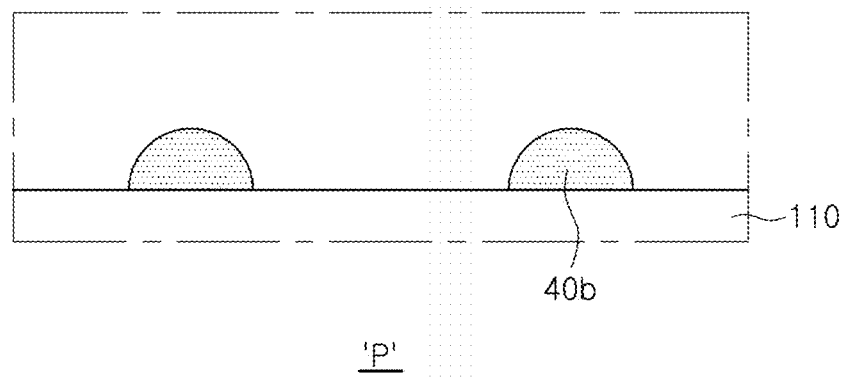
FIGS. 8A, 8B, and 8C illustrate processes in which a coating portion according to the present disclosure is formed by vapor deposition.
Figure 8B:
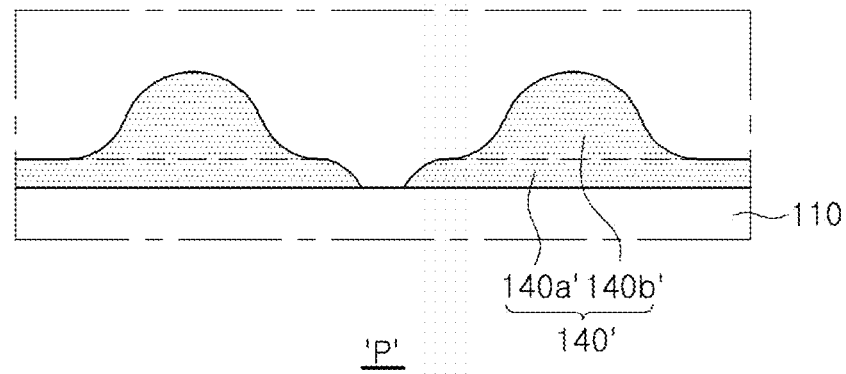
Figure 8C:
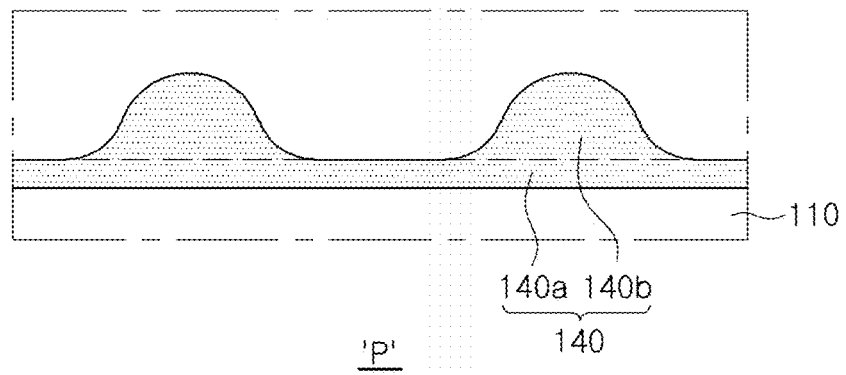

FIGS. 8A, 8B, and 8C illustrate processes in which a coating portion according to the present disclosure is formed by vapor deposition.

Referring to FIG. 8A, a coating material 40b starts to be attached to a portion of a surface of a body 110 at the beginning of a deposition process.

Referring to FIG. 8B, the coating material, attached to the portion of the surface of the body 110, starts to be divided into a thin coating layer 140a' and a projection 140b' as the deposition process is performed.

Referring to FIG. 8C, a coating portion 140 including a coating layer 140a and a plurality of projections 140b may be formed to obtain an electronic component 1000 as the deposition process is further performed.

Figure 9:
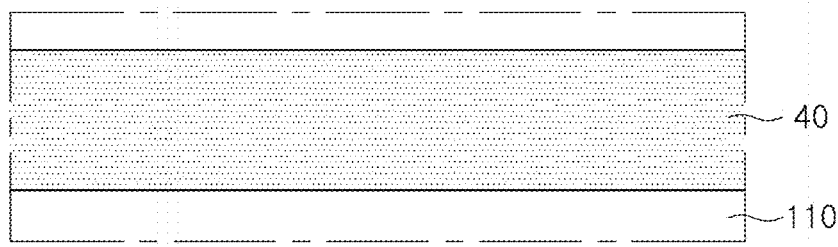
FIG. 9 illustrates a coating portion formed when a deposition process is performed for a significantly long period of time, and illustrates a region corresponding to the region P in FIG. 5.

When the deposition process is performed for a significantly low period of time, a coating portion 40 having a uniform thickness, in which a coating layer and a projection are not distinguished, may be performed and an average thickness of the coating portion 40 may be increased to deteriorate electrical connectivity of an external electrode, as illustrated in FIG. 9.

Time required for the deposition process needs to be appropriately adjusted such that the coating portion 140 may include a coating layer 140a, disposed on an external surface of an electronic component main body 100, and a plurality of projections 140b disposed on the coating layer 140.

The coating layer 140a' may have one or more openings. This is because, as illustrated in FIG. 8B, growth of the coating layer 140a' is insufficient in a certain region, and thus, the coating layer 140a' may be present in a partially broken form.

In this case, an area of the one or more openings may be 10% or less of an overall area of the coating layer 140a'. This is because when the area of the one or more openings is greater than 10% of the overall area of the coating layer 140a', moisture resistance reliability may be deteriorated.

Example

A siloxane-based polymer was vaporized to form a coating portion having an average thickness, listed in Table 1, on a surface of a capacitor chip through a vapor polymerization reaction. Thus, sample chips were prepared, and then a contact angle and centerline average roughness Ra of each of the samples were listed in Table 1. In addition, a poor mountability test was performed on the samples and test results were listed in Table 1.

An average thickness of a coating portion is an average value of a coating portion thickness measured, using an ellipsometer, with respect to a certain line L1 having a length of 400 nm selected in a (1 μm×1 μm) region of a central portion of a second surface of a body in width and length directions (Y and X directions).

A contact angle was listed as an average of values obtained by measuring a contact angle to water in certain five points of the (1 μm×1 μm) region using a contact angle measurement instrument.

A centerline average roughness Ra was expressed in nm as a value obtained by dividing an area of the roughness by a measurement length based on the center line in a surface roughness graph measured, using an atomic force microscope (AFM), with respect to the measurement line.

Poor mountability indicates the number of poor-mountability sample chips. Twelve sample chips of each sample were soldered on a substrate. A case, in which tombstone occurred or both two external electrodes were not fixed, was determined to be poor. The term "tombstone" refers to a phenomenon in which one of the two external electrodes was lifted to cause a chip to rise.

TABLE 1

| Sample No. | Average Thickness of Coating Portion (nm) | Contact Angle (degree) | Ra (nm) | Poor Mountability |
|---|---|---|---|---|
| 1 | 0 | 33 | 0.152 | 0/12 |
| 2 | 2 | 85 | — | — |
| 3 | 3 | 95 | — | — |
| 4 | 5 | 104 | 0.306 | 0/12 |
| 5 | 10 | 102 | — | — |
| 6 | 15 | 107 | 0.3565 | 0/12 |
| 7 | 20 | 103 | 0.348 | 0/12 |
| 8 | 25 | 105 | 0.3895 | 0/12 |
| 9 | 35 | — | — | 5/12 |

In the case of Sample Nos. 1 to 3 in which an average thickness of a coating portion was less than 5 nm, a contact angle of 100 degrees or more could not be secured, so that moisture resistance reliability was deteriorated.

In the case of Sample No. 9 in which an average thickness of a coating portion was greater than 30 nm, poor mountability occurred.

Meanwhile, in the case of Sample Nos. 4 to 8 in which an average thickness of a coating portion was 5 to 30 nm, a contact angle is 100 degrees or more, so that moisture resistance reliability was improved and poor mountability did not occur.

Figure 10:
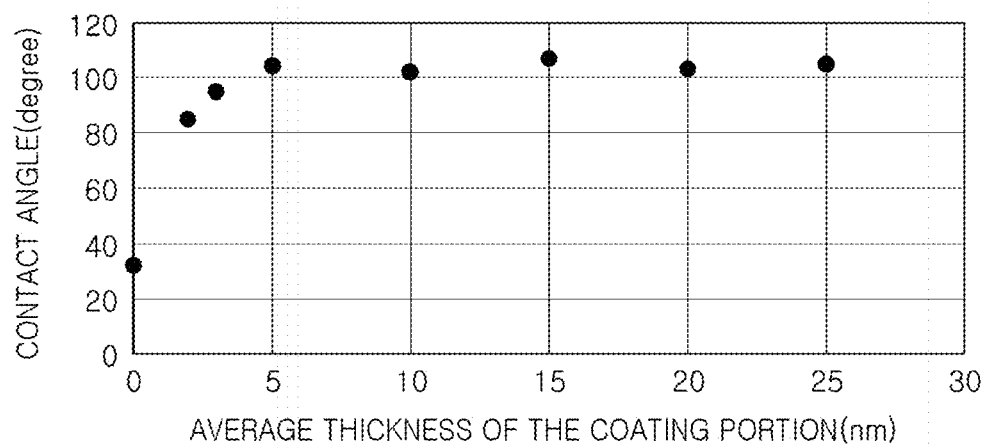
FIG. 10 is a graph illustrating contact angles in Table 1.
Figure 11:
FIG. 11 is a graph illustrating centerline average roughness Ra in Table 1.

Referring to FIG. 10, which is a graph illustrating contact angles in Table 1, and FIG. 11 which is a graph illustrating centerline average roughness Ra in Table 1, it may be confirmed that a contact angle of 100 degrees or more may be stably secured from 5 nm, an average thickness of a coating portion, and centerline average thickness Ra of 0.3 nm or more may be stably secured.

As described above, a coating portion, including a coating layer and a plurality of projections disposed on the coating layer, may be disposed on an external surface of an electronic component main body to improve moisture resistance reliability.

In addition, mountability may be secured through a region of a coating portion in which a projection is not disposed.

Furthermore, a coating portion may be implemented using vapor deposition to improve productivity and to reduce manufacturing costs.

While embodiments have been shown and described above, it will be apparent to those skilled in the art that modifications and variations could be made without departing from the scope of the present disclosure as defined by the appended claims.

What is claimed is:

1. An electronic component comprising:
an electronic component main body including a body and an external electrode disposed on the body, the body including a dielectric layer and an internal electrode; and
a coating portion including a coating layer, disposed on an external surface of the electronic component main body, and a plurality of projections disposed on first portions of the coating layer,
wherein the coating layer includes second portions, arranged between adjacent first portions, which are devoid of the plurality of projections thereon.

2. The electronic component of claim 1, wherein the coating portion has an average thickness of 5 to 30 nm.

3. The electronic component of claim 1, wherein at least one of the plurality of projections has a height of 3 nm or more.

4. The electronic component of claim 1, wherein centerline average roughness of a surface of the coating portion is 0.3 nm or more.

5. The electronic component of claim 1, wherein a contact angle of the coating portion to water is 100 degrees or more.

6. The electronic component of claim 1, wherein the coating portion includes at least one of a siloxane-based polymer or a fluorine-based polymer.

7. The electronic component of claim 1, wherein the coating layer and the projection include the same material.

8. The electronic component of claim 1, wherein the coating layer has one or more openings.

9. The electronic component of claim 8, wherein an area of the one or more openings is greater than 0% and 10% or less of an overall area of the coating layer.

10. The electronic component of claim 1, wherein the coating layer is in contact with an external surface of the external electrode and is in contact with a region of the external surface of the body on which the external electrode is not disposed.

11. The electronic component of claim 1, wherein the external electrode includes an electrode layer, disposed on the body, and a plating layer disposed on the electrode layer.

12. The electronic component of claim 1, wherein the plurality of projections extend outwardly from an external surface of the coating layer so as to have a thickness greater than a thickness of the coating layer.

13. A method for manufacturing an electronic component, the method comprising:
preparing an electronic component main body including a body and an external electrode disposed on the body, the body including a dielectric layer and an internal electrode; and
forming a coating portion, including a coating layer disposed on an external surface of the electronic component main body and a plurality of projections disposed on first portions of the coating layer, using vapor deposition, wherein the coating layer includes second portions, arranged between adjacent first portions, which are devoid of the plurality of projections thereon.

14. The method of claim 13, wherein the coating portion has an average thickness of 5 to 30 nm.

15. The method of claim 13, wherein at least one of the plurality of projections has a height of 3 nm or more.

16. The method of claim 13, wherein the external electrode includes an electrode layer, disposed on the body, and a plating layer disposed on the electrode layer.

17. The method of claim 13, wherein the vapor deposition comprises an initiated chemical vapor deposition (iCVD).

18. An electronic component comprising:
an electronic component main body including a body and an external electrode disposed on the body, the body including a dielectric layer and an internal electrode; and
a plurality of projections comprising an organic material and disposed on an external surface of the electronic component main body,
wherein at least one of the plurality of projections is disposed on an outermost surface of the external electrode.

19. The electronic component of claim 18, wherein the organic material includes a siloxane-based polymer or a fluorine-based polymer.

20. The electronic component of claim 18, wherein at least one of the plurality of projections has a height of 3 nm or more.

21. The electronic component of claim 18, wherein the organic material has an average thickness of 5 to 30 nm.

* * * * *